United States Patent [19]

Shibuya et al.

[11] 4,368,439
[45] Jan. 11, 1983

[54] FREQUENCY SHIFT KEYING SYSTEM

[75] Inventors: Kiyoshi Shibuya, Kawasaki; Hitoshi Shirai, Yokohama, both of Japan

[73] Assignee: Fujitsu Limited, Kawasaki, Japan

[21] Appl. No.: 275,293

[22] Filed: Jun. 19, 1981

Related U.S. Application Data

[63] Continuation of Ser. No. 64,849, Aug. 8, 1979.

[30] Foreign Application Priority Data

Aug. 24, 1978 [JP] Japan ............................. 53-103007

[51] Int. Cl.³ .......................................... H04I 27/12
[52] U.S. Cl. ................................... 332/9 R; 375/62
[58] Field of Search .................... 332/110, 9 R, 11 R; 375/62-65

[56] References Cited

U.S. PATENT DOCUMENTS 3,740,669  6/1973  Nahay ................................. 375/62
3,991,389  11/1976  Dwire ................................. 375/62

Primary Examiner—David K. Moore
Attorney, Agent, or Firm—Staas & Halsey

[57] ABSTRACT

In a frequency shift keying system, sine waves of different frequencies $f_0$ and $f_1$ are selectively provided as a modulated output signal in accordance with the level of an input code. One of two pulse signals having frequencies N times higher than the frequencies $f_0$ and $f_1$ is selected by a selector in accordance with the level of the input code, and the selector output pulse signal is frequency divided by a counter down to 1/N to obtain a pulse signal having a duty ratio of 50% and a frequency of $f_0$ or $f_1$. The pulse signal obtained is converted by a low-pass filter into a sine wave. The modulated output signal has no phase shift even at the point of transition of the input code level and has continuity and hence has little modulation distortion.

4 Claims, 4 Drawing Figures

FREQUENCY SHIFT KEYING SYSTEM

This is a continuation, of application Ser. No. 064,849 filed Aug. 8, 1979.

BACKGROUND OF THE INVENTION

1. Field of the Invention

This invention relates to a frequency shift keying system, and more particularly to a frequency shift keying system for providing modulated output signals of frequencies which differ from the input level of an input code.

2. Description of the Prior Art

There are several existing modulation systems, for example, a system which changes the inductance and the capacitance of an L-C oscillator in accordance with the level of an input code, a system employing an astable multivibrator, and so forth.

However, these conventional systems have the following defects as: The kind of system which switches the inductance and the capacitance of the L-C oscillator is defective in that a fractional bandwidth of the output frequency cannot be made large, that when reactance is changed, a phase shift occurs in the output signal resulting in increased modulation distortion, and thus a circuit adjustment is required. The system employing the astable multivibrator has the drawbacks that the circuit construction is complicated and that frequency stability is low, that is, the output frequency is liable to vary with temperature or input code voltage fluctuation.

SUMMARY OF THE INVENTION

An object of this invention is to provide a frequency shift keying system which prevents a phase shift in the output signal even at a point of transition of the input code level and to ensure continuity of the phase of the output signal and decrease its modulation distortion.

Another object of this invention is to provide a frequency shift keying system in which the output frequency is determined by a clock of excellent frequency stability, thereby preventing the modulated output frequency from varying with temperature change or voltage fluctuation of the input code.

Another object of this invention is to provide a frequency shift keying system which permits a modulation circuit arrangement which produces a modulated output wave having a large fractional bandwidth.

Another object of this invention is to provide a frequency shift keying system which employs a circuit which can be formed, for the most part with electronic parts, such as digital IC's MSI's, etc. so that the circuit is simple in construction and easy to manufacture and requires no adjustment.

Other objects, features and advantages of the present invention will hereinafter become more fully apparent from the following description in conjunction with the accompanying drawings, which will illustrate preferred embodiments of the invention.

DESCRIPTION OF THE PREFERRED EMBODIMENTS

Figure 1:
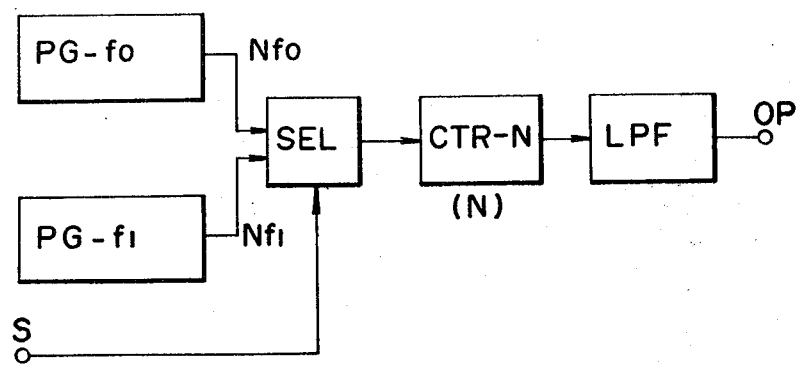
FIG. 1 is a block diagram showing an embodiment of this invention.

In FIG. 1, an input code S is provided to a selector SEL, and from an output terminal OP is derived a modulated output signal of a frequency $f_0$ or $f_1$ which is dependent upon the polarity or level of the voltage of the input code S.

Figure 2:
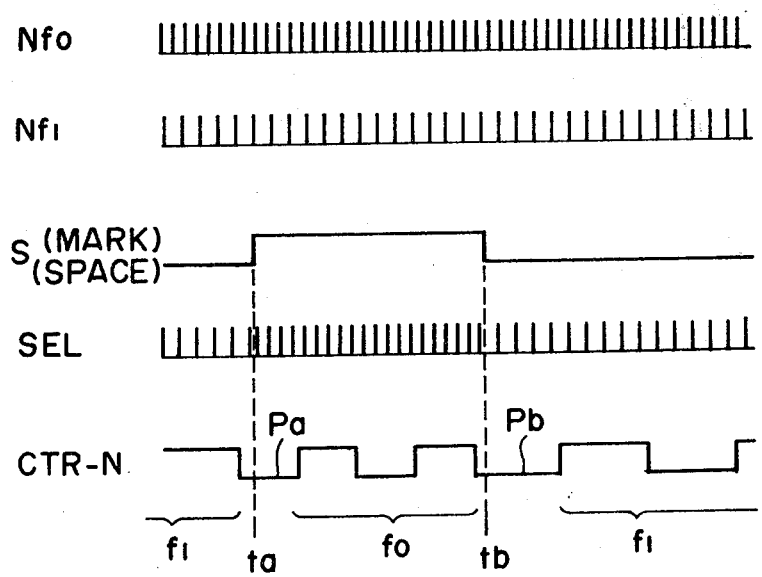
FIG. 2 shows a series of waveforms appearing at various parts of the embodiment of FIG. 1.

Two pulse generators, PG-$f_0$ and PG-$f_1$, are provided. These generators PG-$f_0$ and PG-$f_1$ generate pulses of frequencies $Nf_0$ and $Nf_1$ which are N times higher than the abovesaid modulated output signal frequencies $f_0$ and $f_1$ respectively. These pulses are applied to the selector SEL. The pulse generators PG-$f_0$ and PG-$f_1$ are always in operation regardless of the input code S. In FIG. 2, reference characters $Nf_0$ and $Nf_1$ indicate waveforms of the output pulses from the pulse generators PG-$f_0$ and PG-$f_1$ respectively.

The selector SEL selects one of the outputs from the pulse generators PG-$f_0$ and PG-$f_1$ in accordance with the mark or space of the input code S, that is, the polarity or level of its voltage. For example, in the case of the mark of the input code S, the pulses of the frequency $Nf_0$ from the pulse generator PG-$f_0$ are outputted, whereas in the case of the space of the input code S, the pulses of the frequency $Nf_1$ from the pulse generator PG-$f_1$ are outputted. In FIG. 2, reference character SEL shows the waveforms of the output pulses which are derived from the selector SEL in accordance with the waveform of the input code S.

Reference character CTR-N identifies a pulse counter, which receives the pulse signals from the selector SEL and yields one pulse for each counting of N pulse signals, that is, converts the frequency of the pulse signals to a frequency 1/N. But the output pulse from the pulse counter CTR-N is required to have a duty ratio of 50%. Accordingly, the pulse counter CTR-N is adapted to produce its output while counting N/2 pulses but stop the output while counting the next N/2 pulses. Thus, the pulses of the frequencies $Nf_0$ and $Nf_1$ applied to the pulse counter CTR-N are respectively outputted therefrom as pulses of the frequencies $f_0$ and $f_1$ and the duty ratio 50%. In FIG. 2, reference character CTR-N shows the waveform of the output pulse from the pulse counter CTR-N.

Upon occurrence of a conversion of the input code S from the space to mark and vice versa during suspension of the output from the pulse counter CTR-N, the time lengths of pulse counter suspension periods Pa and Pb including the moments of conversion ta and tb respectively correspond to the duration of N/2 output pulses from the selector SEL and hence are within ½ of the cycles of the pulses having the frequencies $f_0$ and $f_1$ which are obtained by counting N pulses of the frequencies $Nf_0$ and $Nf_1$, respectively. If the conversion of the input code S occurs while the pulse counter CTR-N is sending out the output pulses, the duration of the pulse, including the moment of conversion undergoes the same change as described above. As a consequence, since the length of the duration period of the output pulse from the pulse counter CTR-N or its suspension period at the moment of conversion of the input code S does not greatly vary, no phase shift occurs in the output at the moment of conversion, and the pulses of the frequencies $f_0$ or $f_1$ which are continuous in phase are derived from the pulses of the frequency $Nf_0$ or $Nf_1$ switched by the input code S and outputted.

The output from the pulse counter CTR-N is applied to a low-pass filter LPF, in which the output pulses of the frequency $f_0$ or $f_1$ and of the duty ratio 50% are converted into a sine wave, which is outputted as a FS modulated signal from the output terminal OP.

Figure 3:
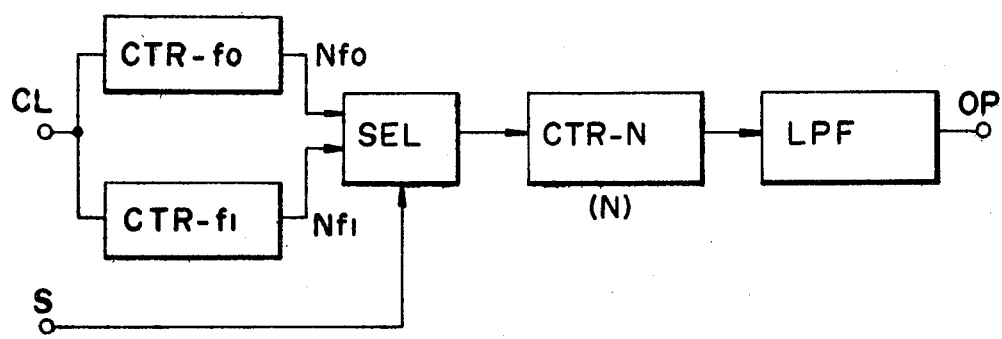
FIGS. 3 and 4 are block diagrams respectively illustrating other embodiments of this invention.

FIG. 3 illustrates in block form another embodiment of this invention. In FIG. 3, like reference characters are used to indicate the same parts as those in FIG. 1. In this embodiment, pulse counters CTR-$f_0$ and CTR-$f_1$ are provided as pulse generators, and these pulse counters respectively count clock pulse supplied from the same clock pulse source CL and generate pulses of the frequencies $Nf_0$ and $Nf_1$, N times higher than the modulated output frequencies $f_0$ and $f_1$. These pulses are respectively provided to the selector SEL. The subsequent operations are exactly the same as those performed in the embodiment of FIG. 1; therefore, no detailed description will be repeated.

Since this embodiment employs the clock pulse source CL which provides pulses of a stable frequency, it is easy to obtain a modulated output of having a stable frequency.

Figure 4:
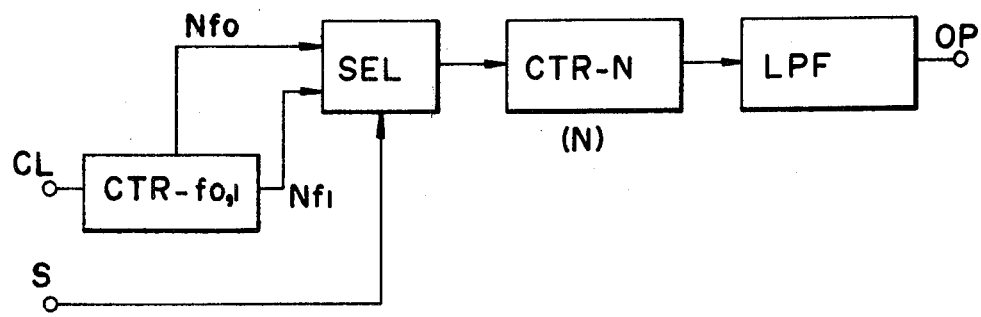

FIG. 4 shows in block form still another embodiment of this invention. In FIG. 4, parts corresponding to those in FIG. 3 are marked with the same reference characters. In this embodiment, a counter CTR-$f_{0,1}$ is provided as a pulse generator and is adapted to produce a pulse of the frequency $Nf_1$ upon each counting of m clock pulses supplied from the clock pulse source CL and a pulse of the frequency $Nf_0$ upon each counting of n clock pulses. This can easily be achieved when m/n is an integer. The pulses of the frequencies $Nf_0$ and $Nf_1$ thus obtained are respectively provided to the selector SEL. The subsequent operations are identical with those in the embodiments of FIGS. 1 and 3; therefore, no detailed description will be repeated.

With the abovesaid embodiment of FIG. 4, the number of counters used is one less than the embodiment of FIG. 3.

Numerous changes and modifications may be made in the above described embodiments and different embodiments of the invention may be made without departing from the spirit thereof; therefore, it is intended that all matter contained in the foregoing description and in the accompanying drawings shall be interpreted as illustrative and not in a limiting sense.

What is claimed is:

1. A frequency shift keying system, for receiving an input code and for producing modulated output signals of different frequencies in dependence upon the state of the input code, comprising:

pulse source means for continuously providing, as an output pulse signals of frequencies respectively N times greater than the modulated output signals of different frequencies where N is an integer;

selector means, operatively connected to receive the input code and operatively connected to said pulse source means, for selectively outputting one of said pulse signals from said pulse source means in dependence upon the state of the input code;

a pulse counter, operatively connected to said selector means, for counting pulses from the output of said selector means and for providing a counter pulse signal at a frequency 1/N, said counter pulse signal having a duty ratio of 50%;

a low-pass filter, connected to said pulse counter, for converting said counter pulse signal into a sine wave having the same frequency as said counter pulse signal.

2. A frequency shift keying system according to claim 1, wherein said pulse source means comprises pulse generators, operatively connected to said selector means, for continuously generating said pulse signals of frequencies respectively N times greater than the modulated output signals of different frequencies.

3. A frequency shift keying system according to claim 1, wherein the frequency shift keying system is operatively connected to a clock pulse generating means for providing clock pulses and wherein said pulse source means comprises clock counters, operatively connected to said selector means, for counting the clock pulses and for continuously generating said pulse signals of frequencies respectively N times greater than the modulated output signals of different frequencies.

4. A frequency shift keying system according to claim 1, wherein the frequency shift keying system is operatively connected to a clock pulse generating means for providing clock pulses and wherein said pulse source means comprises a clock counter, operatively connected to said selector means, for providing the pulse signals of frequencies N times greater than the modulated output signals of different frequencies, wherein a first of said pulse signals of frequencies N times greater than one of the modulated output signals of different frequencies is provided upon each counting of m clock pulses and a second of said pulse signals of frequencies N times greater than another one of the modulated output signals of different frequencies is provided upon each counting of n clock pulses, where m and n are integers.

* * * * *

UNITED STATES PATENT AND TRADEMARK OFFICE
CERTIFICATE OF CORRECTION

PATENT NO. : 4,368,439
DATED : JANUARY 11, 1983
INVENTOR(S) : KIYOSHI SHIBUYA ET AL.

It is certified that error appears in the above-identified patent and that said Letters Patent is hereby corrected as shown below:

Column 1, line 21, delete "as".

Signed and Sealed this

Fifth Day of April 1983

[SEAL]

Attest:

GERALD J. MOSSINGHOFF

*Attesting Officer*     *Commissioner of Patents and Trademarks*